United States Patent
Ghosh et al.

(10) Patent No.: US 9,804,977 B2
(45) Date of Patent: Oct. 31, 2017

(54) UNIVERSAL SERIAL BUS SMART HUB

(71) Applicant: Microchip Technology Incorporated, Chandler, AZ (US)

(72) Inventors: Atish Ghosh, Austin, TX (US); Cecil G. Chenault, Leander, TX (US); Pragash Mangalapandian, Chennai (IN); Mark Bohm, Village of Bear Creek, TX (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/698,428

(22) Filed: Apr. 28, 2015

(65) Prior Publication Data

US 2016/0321195 A1   Nov. 3, 2016

(51) Int. Cl.
| | |
|---|---|
| G06F 3/00 | (2006.01) |
| G06F 5/00 | (2006.01) |
| G06F 13/12 | (2006.01) |
| G06F 13/00 | (2006.01) |
| G06F 13/20 | (2006.01) |
| G06F 13/10 | (2006.01) |
| G06F 13/38 | (2006.01) |

(Continued)

(52) U.S. Cl.
CPC .......... G06F 13/102 (2013.01); G06F 1/266 (2013.01); G06F 13/387 (2013.01); G06F 13/4282 (2013.01); G06F 13/4295 (2013.01); G06F 2213/3812 (2013.01); G06F 2213/4004 (2013.01)

(58) Field of Classification Search
CPC .... G06F 3/0661; G06F 3/1209; G06F 12/063; G06F 13/42; G06F 13/102; G06F 2213/3812; G06F 2213/4004
USPC ...................................... 710/63, 58, 100, 313
See application file for complete search history.

(56) References Cited

U.S. PATENT DOCUMENTS

| | | | |
|---|---|---|---|
| 2007/0079045 A1* | 4/2007 | Luke | G06F 13/376 710/313 |
| 2009/0248904 A1* | 10/2009 | Takamoto | G06F 13/4045 710/8 |

(Continued)

OTHER PUBLICATIONS

International Search Report and Written Opinion, Application No. PCT/US2016/025798, 11 pages, dated Jul. 11, 2016.

Primary Examiner — Farley Abad
Assistant Examiner — Getente A Yimer
(74) Attorney, Agent, or Firm — Slayden Grubert Beard PLLC

(57) ABSTRACT

A USB smart hub may provide enhanced battery charging, data storage security, vendor matching, device authentication, data capture/debug, and role switching. The smart hub may include an upstream port, a plurality of downstream ports, a processor, and a memory coupled to the processor for storing USB host stack code and configuration parameters. The smart hub may include a USB hub core having a core to implement a standard USB hub interface. The smart hub may include a plurality of 2:1 multiplexors coupled between the downstream ports, the core downstream ports, and the processor. The processor may control the 2:1 multiplexors. The processor may be configured to detect when a USB device is coupled to a downstream port and to run the USB host stack code and to enumerate the USB device. The processor may provide enhanced features based on the configuration parameters.

30 Claims, 8 Drawing Sheets

(51) Int. Cl.
*G06F 1/26* (2006.01)
*G06F 13/42* (2006.01)

(56) References Cited

U.S. PATENT DOCUMENTS

| | | | |
|---|---|---|---|
| 2010/0115147 A1* | 5/2010 | Kim | H04M 1/6058 710/14 |
| 2010/0205463 A1 | 8/2010 | Magnusson | 713/300 |
| 2010/0235655 A1 | 9/2010 | Tauscher et al. | 713/300 |
| 2011/0055448 A1* | 3/2011 | Henkel | G06F 13/385 710/305 |
| 2012/0105201 A1* | 5/2012 | Sanders | G05B 15/02 340/5.83 |
| 2012/0166697 A1* | 6/2012 | Hu | H02J 7/0042 710/300 |
| 2012/0286792 A1* | 11/2012 | Gorbold | G01R 31/3658 324/426 |
| 2013/0151731 A1* | 6/2013 | Lai | G06F 13/4068 710/3 |
| 2015/0074312 A1* | 3/2015 | Barus | G06F 13/4027 710/306 |
| 2015/0089092 A1 | 3/2015 | Voto et al. | 710/14 |

* cited by examiner

| | A | B | C | D | E | F | G | H | I |
|---|---|---|---|---|---|---|---|---|---|
| | VID | PID | Charge? | Charge Type | Charge Specification | Vendor of Choice? | Auth Req'd? | Authentication Specification | Flex Connect? |
| 1 | 0x1234 | 0x0008 | 0 | 0 | - | 0 | 0 | - | 1 |
| 2 | 0x1234 | 0x000f | 1 | 0 | Electrical Signaling Specification | 0 | 0 | - | 0 |
| 3 | 0x1234 | 0x0012 | 1 | 1 | Message-Based Handshake Specification | 0 | 0 | - | 0 |
| 4 | 0x62df | 0x005c | 0 | 0 | - | 1 | 0 | - | 0 |
| 5 | 0x540b | 0x0003 | 0 | 0 | - | 1 | 0 | - | 0 |
| 6 | 0x34ac | 0x0101 | 0 | 0 | - | 0 | 1 | Authentication Specification | 0 |

| | |
|---|---|
| Data Security? | Yes / No |
| Data Security Level 2? | Yes / No |
| Data Security Specification | DS_Specification |
| Vendor of Choice? | Yes / No |
| Vendor of Choice Specification | VoC_Specification |
| Auto Respond? | Yes / No |
| Auto Respond Specification | AR_Specification |
| Data Reflect? | Yes / No |
| Data Reflect Specification | DR_Specification |
| Flexconnect Switching? | Yes / No |

UNIVERSAL SERIAL BUS SMART HUB

TECHNICAL FIELD

The present disclosure relates to systems and methods for use with Universal Serial Bus (USB) hubs, and more particularly, to improved systems and methods for enhancing battery charging, data storage security, vendor matching, device authentication, data capture/debug, and role switching at a USB hub device.

BACKGROUND

USB hubs are ubiquitous in modern electronics devices (e.g., personal computers ("PCs"), tablet PCs, cell phones, automobile infotainment systems, personal gaming systems, toys, etc.). It is a "universal" interface that allows keyboards, monitors, printers, storage devices, cameras, phones, toys, games, and numerous other electronic devices to work on a single interface. Being universal creates its own set of challenges including those related to authentication, validation, security, and custom data handling, among others. Vendors have attempted to overcome these challenges by customizing the operating system and/or USB stack/drivers. These types of customizations can be costly and may result in sub-optimal compatibility between electronic devices that are connected to a USB interface.

SUMMARY

Therefore a need exists for an improved USB hub that can provide enhanced battery charging, data storage security, vendor matching, device authentication, data capture/debug, and role switching without requiring changes to the operating system or USB stack/drivers.

According to an embodiment, a USB hub is provided which may include a hub upstream port, a plurality of hub downstream ports, a processor, and a memory communicatively coupled to the processor for storing USB host stack code and a plurality of configuration parameters. USB hub may further include a USB hub core having a core upstream port and a plurality of core downstream ports. The USB hub core may be operable to implement a USB hub interface between the core upstream port and the plurality of core downstream ports. The USB hub may further include a plurality of multiplexors, and each multiplexor may having a first port communicatively coupled to one of the hub downstream ports, a second port communicatively coupled to one of the plurality of core downstream ports, a third port communicatively coupled to the processor, and a select input communicatively coupled to the processor and operable to communicatively couple the first port with the second port, the third port, or both the second port and the third port. The processor may be configured to detect when a USB device is coupled to a first one of the plurality of hub downstream ports. The processor may be further configured to control the select input of a first multiplexor corresponding to the first hub downstream port so that the first port is connected to the third port. In addition, the processor may be configured to run the USB host stack code and to enumerate the USB device.

According to a further embodiment, a method is provided for enhanced battery charging in a USB hub including a plurality of hub downstream ports and a processor running USB host stack code. The processor may detect when a USB device is coupled to a first one of the plurality of hub downstream ports and may enumerate the USB device. The processor may further obtain a product ID (PID) and a vendor ID (VID) from the USB device and use the PID and the VID to determine a custom battery charging protocol for the USB device. The processor may then cause the USB hub to charge the USB device using a specific battery charging protocol corresponding to the USB device.

According to a further embodiment, a method is provided for data security in a USB hub including a plurality of hub downstream ports and a processor running USB host stack code. The processor may detect when a USB device is coupled to a first one of the plurality of hub downstream ports and may enumerate the USB device. The processor may further obtain information (e.g., device class code, descriptor information, etc.) from the USB device and use the device class code to determine that the USB device should be blocked. The processor may then cause the USB hub to block the USB device connection.

According to a further embodiment, a method is provided for data security in a USB hub including a plurality of hub downstream ports and a processor running USB host stack code. The processor may detect when a USB device is coupled to a first one of the plurality of hub downstream ports and may enumerate the USB device. The processor may further obtain information (e.g., device class code, descriptor information, etc.) from the USB device and use the device class code to determine that the USB hub should establish a USB to USB bridge between the USB device and an upstream USB host. The processor may then implement the USB to USB bridge between the USB device and the upstream USB host.

According to a further embodiment, a method is provided for vendor device preference in a USB hub including a plurality of hub downstream ports and a processor running USB host stack code. The processor may detect when a USB device is coupled to a first one of the plurality of hub downstream ports and may enumerate the USB device. The processor may further obtain a product ID (PID) and a vendor ID (VID) from the USB device and use the PID and the VID to determine that the USB device is not a vendor of choice device. The processor may then cause the USB device to enumerate with a sub-optimal configuration upon determining that the USB device is not a vendor of choice device.

According to a further embodiment, a method is provided for device authentication in a USB hub including a plurality of hub downstream ports and a processor running USB host stack code. The processor may detect when a USB device is coupled to a first one of the plurality of hub downstream ports and may enumerate the USB device. The processor may further obtain a product ID (PID) and a vendor ID (VID) from the USB device and use the PID and the VID to determine that the USB device requires authentication. The processor may then issue an authentication challenge to the USB device upon determining that the USB device requires authentication. The processor may further obtain an authentication challenge response from the USB device, and may block the USB device connection upon determining that the response is incorrect.

According to another embodiment, a method is provided for data reflection in a USB hub including a plurality of hub downstream ports and a processor running USB host stack code. The processor may determine a source port from the plurality of hub downstream ports. The processor may also determine a destination port from the plurality of hub downstream ports. The processor may further cause data at the source port to be reflected at the destination port.

BRIEF DESCRIPTION OF THE DRAWINGS

A more complete understanding of the present disclosure may be acquired by referring to the following description taken in conjunction with the accompanying drawings wherein:

FIG. 2 illustrates a table of an example database for providing enhanced battery charging, vendor matching, and device authentication in a USB hub, in accordance with certain embodiments of the present disclosure;

FIG. 3 illustrates example configuration options for providing enhanced battery charging, data storage security, vendor matching, device authentication, data capture/debug, and role switching, in accordance with certain embodiments of the present disclosure;

Figure 1:
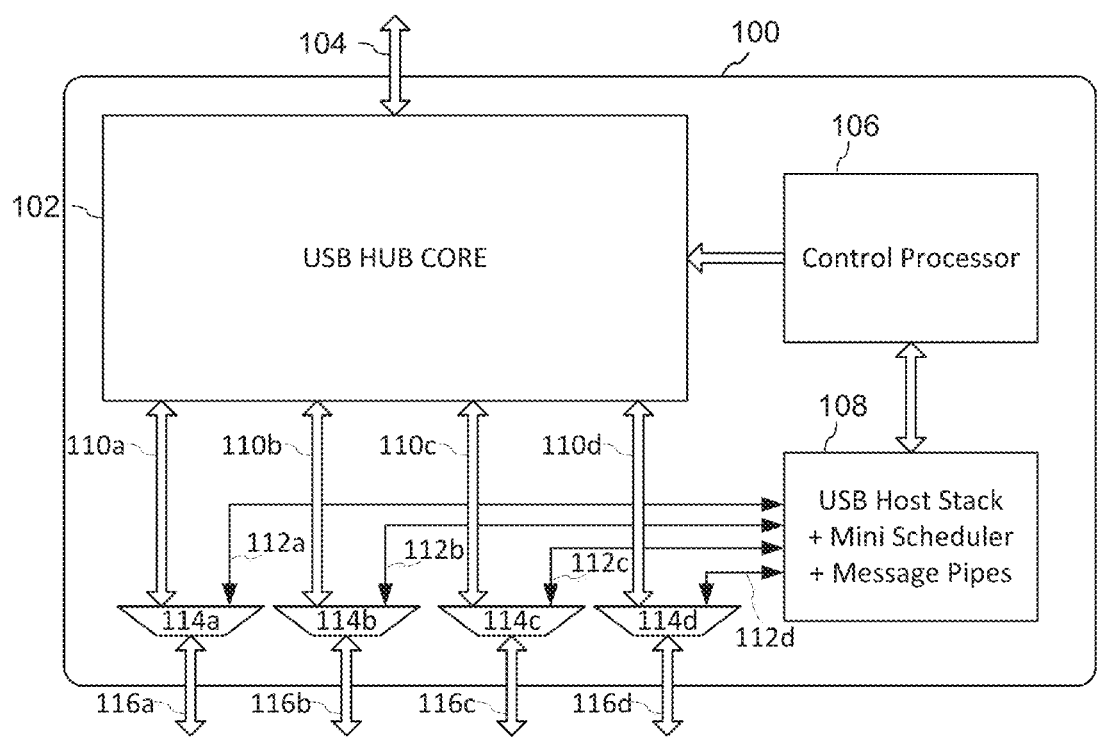
FIG. 1 illustrates a block diagram of an example USB hub that can provide enhanced battery charging, data storage security, vendor matching, device authentication, data capture/debug, and role switching, in accordance with certain embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to various embodiments, a USB hub that can provide enhanced battery charging, data storage security, vendor matching, device authentication, data capture/debug, and role switching without requiring changes to the operating system or USB stack/drivers can be provided.

Referring now to the drawings, the details of example embodiments are schematically illustrated. Like elements in the drawings will be represented by like numbers, and similar elements will be represented by like numbers with a different lower case letter suffix.

FIG. 1 illustrates a block diagram of an example USB hub that can provide enhanced battery charging, data storage security, vendor matching, device authentication, data capture/debug, and role switching, in accordance with certain embodiments of the present disclosure. As depicted in FIG. 1, USB hub 100 may comprise a USB hub core 102, upstream port 104, control processor 106, USB host stack+ mini-scheduler+message pipes 108, and 2:1 multiplexors/demultiplexors 114a-d that communicatively couple downstream ports 116a-d with, for example, USB hub core 102 output signals 110a-d and signals 112a-d. Upstream port 104 and downstream ports 116a-d may be capable of carrying USB-compliant signaling between USB hub 100 and upstream/downstream ports. While the embodiment depicted in FIG. 1 includes a 4-port USB hub, alternative embodiments may include any number of ports (e.g., 2, 3, 10, 16, etc.).

Control processor 106 may comprise any system, device, or apparatus operable to interpret and/or execute program instructions and/or process data, and may include, without limitation, a microprocessor, microcontroller, digital signal processor, application specific integrated circuit (ASIC), or any other digital or analog circuitry configured to interpret and/or execute program instructions and/or process data. Control processor 106 may be communicatively coupled to USB Hub core 102 to provide signaling appropriate to implement/control a USB hub as well as the additional features provided by the various embodiments of the present disclosure. Control processor 106 may also be communicatively coupled to (e.g., implement, control, etc.) USB host stack 108 (including the mini scheduler and message pipes). Control processor 106 may also be communicatively coupled to multiplexors/demultiplexors 114a-d, for example, to transmit or receive signals 112a-d and/or provide select signaling (not shown) to multiplexors/demultiplexors 114a-d. Control processor may also be communicatively coupled to other resources (not shown), including memory (e.g., volatile, non-volatile, etc.), storage media (e.g., flash, EEPROM, solid state storage media, etc.), etc.

USB hub core 102 may comprise any system, device, or apparatus operable to implement a USB hub interface, and may include, without limitation, an application specific integrated circuit (ASIC) or any other digital or analog circuitry (and necessary software/firmware) configured to implement a USB hub interface. In certain embodiments, USB hub core may support the USB On the Go (OTG) signaling. In the same or additional embodiments, USB hub core 102 may be a hub controller provided by Microchip Technology, Inc. (Microchip) that supports Microchip's FlexConnect feature. The FlexConnect feature may allow the hub to dynamically change the physical ports that act as upstream and downstream ports. These features may allow for connections to multiple products that act as both a USB Host and a USB Device without the requirement of two dedicated connectors.

USB host stack 108 may comprise any software, hardware, or combination of software/hardware operable to implement a USB host controller. In certain embodiments, USB host stack 108 may be fully-USB-compliant, supporting all valid transactions defined by any of the USB specifications. In alternative embodiments, USB host stack 108 may implement only certain aspects of the USB specification, for example, by (i) supporting only certain peripheral devices and/or classes of devices, (ii) supporting only certain transfer types required by supported devices, (iii) having relaxed power requirements, (iv) etc. In one embodiment, USB host stack 108 may be the royalty-free embedded host stack provided by Microchip for use with Microchip microcontrollers.

In operation, USB hub 100 may provide enhanced USB features such as battery charging, data storage security, vendor matching, device authentication, data capture/debug, and role switching. Control processor 106 may execute software and/or firmware generally operable to interact with USB hub core 102 and to implement USB host stack+mini-scheduler+message pipes 108 in accordance with certain embodiments of the present disclosure. In certain embodiments, control processor 106 may execute software and/or firmware generally operable to store and retrieve information including, without limitation, database tables and/or configuration information similar to that illustrated in FIGS. 2-3.

FIG. 2 illustrates a table of an example database 200 for providing enhanced battery charging, vendor matching, and device authentication in a USB hub, in accordance with certain embodiments of the present disclosure. Database 200 may be implemented in many different formats including, without limitation, in text files, binary files, a relational database, etc. Each row of database 200 may contain an entry related to a USB device that is supported by USB hub 100 and may store information used by USB hub 100 in transactions involving the supported device. In certain exemplary embodiments, database 200 may store the vendor ID ("VID") (column A), product ID ("PID") (column B), enhanced charging indicator (column C), charge type (column D), charge specification (column E), vendor of choice indicator (column F), authentication required indicator (column G), authentication specification (column H), and Flex-Connect indicator (column I). According to the USB specification, each USB component (device, host, hub, etc.) may be assigned a VID and a PID, for example, to allow for easy identification of the component. The VID and PID columns of database 200 may correspond to these pre-assigned VID/PID values. In this manner, USB hub 100 may provide enhanced battery charging, vendor matching, and device authentication specific to the different USB components that may be connected to USB hub 100.

In operation, when a USB component is connected to USB hub 100, control processor 106 may obtain the VID/PID information from the device. In one embodiment, USB hub 100 may utilize USB host stack+mini scheduler+message pipes 108 and act as a USB host to enumerate the device and obtain the device descriptors (which include the VID/PID information). In an alternative embodiment, control processor may obtain the VID/PID information from the device by "listening" to the enumeration process as the host connected to upstream port 104 enumerates the newly-attached device via USB hub core 102 (standard USB protocol). In the former embodiment, control processor 106 may configure multiplexors/demultiplexors 114*a-d* so that USB hub core 102 does not recognize the device attach event. After enumerating the device, USB hub 100 may manage the connection between the newly-attached device and the USB host at upstream port 104 so that the device is appropriately enumerated by the upstream host. USB hub 100 may accomplish this in any number of ways known to those familiar with the USB protocol. For example, USB hub 100 may force a disconnect event on the downstream port to which the device is attached and thereafter allow enumeration by the upstream host. In an alternative embodiment, USB hub 100 may reset the device and thereafter allow enumeration by the upstream host. In an alternative embodiment, USB hub 100 may emulate a new attach event to the upstream host and forward the device's descriptors to the USB host on upstream port 104 and then resume normal hub signaling (i.e., cease emulation) at the appropriate time. In these embodiments, control processor 106 controls multiplexors/demultiplexors 114*a-d* so that the signaling is appropriately routed to either (1) the USB hub core or (2) the control processor running the USB host stack. In certain embodiments, when multiplexors/demultiplexors 114*a-d* are routing the downstream port signals to the control processor, signals 110*a-d* connected to USB hub core may be configured to reflect no attached devices. Thus, by changing the select input on multiplexors/demultiplexors 114*a-d* (i.e., resulting in routing to the USB hub core), USB hub core may determine that a device attach event has occurred.

Regardless of the manner in which USB hub 100 obtains the VID/PID information, after doing so, USB hub 100 may then search database 200 for a matching VID/PID. If the VID/PID is found in database 200, control processor 106 may determine that the connected USB component is supported by USB hub 100 and provide certain enhanced features depending on the other parameters stored in database 200 corresponding to that USB component. For example, if enhanced charging indicator (column C) is enabled (e.g., row 2) for a matching VID/PID, USB hub 100 may provide for enhanced battery charging on that USB port. In this case, charge type (column D) and charge specification (column E) entries in database 200 may provide additional information related to the way in which the USB component should be charged. (More specifics related to enhanced charging are provided in the discussion of FIG. 4.) As another example, if vendor of choice indicator (column F) is enabled (e.g., row 4) for a matching VID/PID, USB hub 100 may provide enhanced vendor matching features. (More specifics related to enhanced vendor matching features are provided in the discussion of FIGS. 3 & 6.) In yet another example, if the authentication required indicator (column G) is enabled (e.g., row 6) for a matching VID/PID, USB hub 100 may require authentication before fully connecting the USB component. In this case, the authentication specification (column H) entry in database 200 may provide additional specifics related to the way in which the USB component should be authenticated. (More specifics related to the authentication feature are provided in the discussion of FIG. 7.) In yet another example, if the FlexConnect indicator (column I) is enabled (e.g., row 1) for a matching VID/PID, USB hub 100 may provide the device with the option to initial role switching and act as a USB host. (More specifics related to the role switching feature are provided in the discussion of FIG. 9.)

The values stored in database 200 may be hard coded, configurable, or some combination of the two. In certain embodiments, the manufacturer of USB hub 100 may desire to hard-code the values of database 200 prior to selling USB hub 100 so that the database cannot be modified. For example, database 200 may be stored in a read-only section of memory or be write protected. In other embodiments, the manufacturer may provide default values database 200, but may allow for later modification by the user. For example, a user of USB hub 100 may be able to modify database 200 by plugging the hub into a USB host and using software on the USB host to update the database (e.g., by downloading new vendor/product information, from the internet, manually editing the table, etc.). In certain embodiments, modification of database 200 may be performed in an unsecured manner so that any user of USB hub 100 may modify the database. In other embodiments, modification of database 200 may only be performed by users with correct credentials (e.g., password, etc.).

FIG. 3 illustrates example configuration options table 300 for providing data storage security, vendor matching, data capture/debug, and role switching, in accordance with certain embodiments of the present disclosure. In some embodiments, configuration options table 300 may be stored in software including, without limitation, in text files, binary files, a relational database, etc. In other embodiments, configuration options table 300 may be hard-wired in hardware (e.g., tied low (disabled), tied high (enabled), connected to a GPIO pin on control processor 106, etc.). The first column in configuration options table 300 may correspond to configuration options that may be available in an example embodiment of the present disclosure. In other embodiments, more or fewer columns may exist, depending on the features supported by the particular USB hub 100. The second column in configuration options table 300 may correspond to the configuration values, as determined by the vendor or user of USB hub 100.

The values stored in configuration options table 300 may be hard coded, configurable, or some combination of the two. In certain embodiments, the manufacturer of USB hub 100 may desire to hard-code the values of configuration options table 300 prior to selling USB hub 100 so that the configuration options cannot be modified (i.e., are non-configurable). For example, the values of configuration options table 300 may be stored in a read-only section of memory. In other embodiments, the manufacturer may provide default values for configuration options table 300, but may allow for later modification by the user. For example, a user of USB hub 100 may be able to modify the values in configuration table 300 by plugging the hub into a USB host and using software on the USB host to set the values. In certain embodiments, this modification may be performed in an unsecured manner so that any user of USB hub 100 may modify the values. In other embodiments, modification of the values in the configuration table 300 may only be performed by users with correct credentials (e.g., password, etc.).

In the embodiment depicted in FIG. 3, configuration options table 300 contains the following configuration options: The "Data Security?" option is used to determine whether the data security feature is enabled. The "Data Security Level 2?" option is used to determine whether the data security level 2 feature is enabled. The "Data Security Specification" entry provides additional information related to the way in which USB hub 100 should implement the data security feature. (More specifics related to the data security features are provided in the discussion of FIG. 5.) The "Vendor of Choice" option is used to determine whether the vendor of choice feature is enabled. The "Vendor of Choice Specification" entry provides additional information related to the way in which USB hub 100 should implement the vendor of choice feature. (More specifics related to enhanced vendor matching features are provided in the discussion of FIGS. 3 & 6.) The "Auto Respond?" option is used to determine whether the auto respond feature is enabled. The "Auto Respond Specification" entry provides additional information related to the way in which USB hub 100 should implement the auto respond feature. The "Data Reflect?" option is used to determine whether the data reflect feature is enabled. The "Data Reflect Specification" entry provides additional information related to the way in which USB hub 100 should implement the data reflect feature. (More specifics related to the auto respond and data reflect features are provided in the discussion of FIG. 8.) The "Flexconnect Switching?" option is used to determine whether the Flexconnect switching feature is enabled. (More specifics related to the Flexconnect switching feature are provided in the discussion of FIG. 9.)

Battery Charging

USB connectors are used for charging all types of electronics devices, including, without limitation, smartphones, tablets, games, toys, and the like. The USB specification defines a protocol for charging USB devices over a USB connection. However, many USB devices do not follow this protocol, and instead implement vendor- or product-specific charging protocols, such as a custom electrical handshake or a custom USB message-based handshake. This can lead to sub-optimal charging rates when using the standard USB charging protocol to charge these devices (i.e., the method used by a generic USB hub). By storing vendor- and/or product-specific charging information, USB hub 100 may implement the optimal charging protocol for any device that is connected to USB hub 100.

Figure 4:
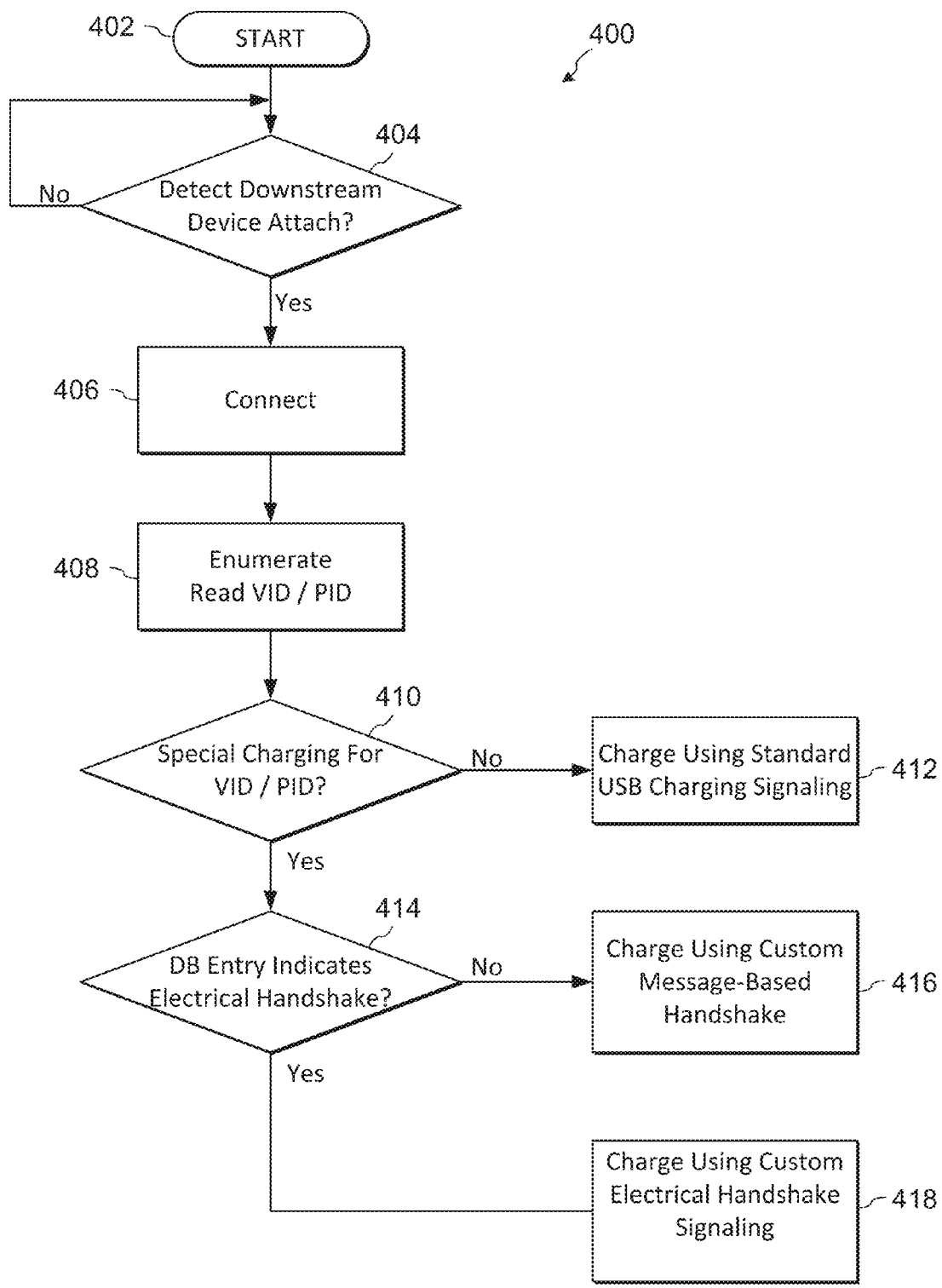
FIG. 4 illustrates a flow chart of an example method for providing enhanced battery charging in a USB hub, in accordance with certain embodiments of the present disclosure.

FIG. 4 illustrates a flow chart of an example method 400 for providing enhanced battery charging in a USB hub, in accordance with certain embodiments of the present disclosure. According to one embodiment, method 400 preferably begins at step 402. As noted above, teachings of the present disclosure may be implemented in a variety of configurations of USB hub 100. As such, the preferred initialization point for method 400 and the order of the steps 402-418 comprising method 400 may depend on the implementation chosen.

At step 402, USB hub 100 may initialize. For example, USB hub 100 may be powered on (via power source or connection to USB host), and USB hub core 102 may initialize. At step 404, USB hub 100 may continuously check to determine whether a downstream device has been attached, for example, to one of downstream ports 116*a-d*. If no downstream devices have been attached, USB hub 100 may return to step 404 and continue in this manner until a downstream device is detected. Upon detecting a downstream device connect, USB hub 100 may connect to the detected device at step 406 and may enumerate the device at step 408. During enumeration, USB hub 100 may read the VID and PID of the newly-attached device.

At step 410, USB hub 100 may determine whether the newly-attached device implements a non-standard charging protocol. For example, the VID/PID may be provided to control processor 106, and control processor 106 may query database 200 to determine whether it contains an entry (row) that matches the VID/PID of the newly-attached device and whether any matching entry indicates that the device follows a vendor- or product-specific charging protocol (i.e., column C "Charge?" is enabled). If there is no VID/PID match in database 200, method 400 may proceed from step 410 to step 412 and may attempt to charge the newly-attached device using the standard USB charging protocol. Similarly, if there is a VID/PID match in database 200, but the "Charge?" column for the matching row is not enabled, method 400 may proceed from step 410 to step 412 and may attempt to charge the newly-attached device using the standard USB charging protocol. If there is a VID/PID match in database 200 and the "Charge?" column for that matching row is enabled, method 400 may proceed to step 414.

At step 414, USB hub 100 may determine whether the matching database entry indicates a custom electrical handshake charging protocol. In the example depicted in FIG. 2, a zero (0) in the "Charge Type" column may indicate a custom electrical handshake charging protocol (e.g., row 2) while a one (1) in the "Charge Type" column may indicate a custom message-based handshake charging protocol (e.g., row 3). According to this embodiment, if USB hub 100 determines at step 414 that the "Charge Type" is set to zero (0), indicating a custom electrical handshake, method 400 may proceed to step 418. If USB hub 100 instead determines at step 414 that the "Charge Type" is set to one (1), indicating a custom message-based handshake, method 400 may proceed to step 416.

At step 416, USB hub 100 may charge the newly-attached device using a custom message-based handshake protocol. In certain embodiments, the specifics of this protocol may be saved in database 200 as a "Message-Based Handshake Specification" (e.g., row 3) in the "Charge Specification" column. The Message-Based Handshake Specification may comprise an instruction, descriptor, or multiple instructions/descriptors that describe the custom message-based handshake protocol implemented by the USB component. The number of instructions/descriptors needed may be implementation dependent and may vary based on the number of devices supported by USB hub 100. Control processor 106 may be operable to decode the Message-Based Handshake Specification for any supported device and may use the information to control the protocol on the downstream port. In this manner, USB hub 100 may implement the optimal vendor- or product-specific message-based handshake charging protocol.

At step 418, USB hub 100 may charge the newly-attached device using a custom electrical handshake protocol, for example by setting a specific resistance, voltage, or current for the downstream port. In certain embodiments, the specifics of this protocol may be saved in database 200 as an "Electrical Signaling Specification" (e.g., row 3) in the "Charge Specification" column. The Electrical Signaling Specification may comprise an instruction, descriptor, or multiple instructions/descriptors that describe the custom electrical handshake protocol implemented by the USB component. The number of instructions/descriptors needed may be implementation dependent and may vary based on the number of devices supported by USB hub 100. Control processor 106 may be operable to decode the Electrical Signaling Specification for any supported device and may use the information to control the protocol on the downstream port. In this manner, USB hub 100 may implement the optimal vendor- or product-specific electrical handshake charging protocol.

Data Security

In secure facilities, the theft of secure data is a major concern. The USB port that is used to connect a keyboard, mouse, or printer can also be used to connect a storage device, where large amounts of data can be downloaded in a very short time. To prohibit unauthorized data access, certain embodiments of USB hub 100 may implement data security features. For example, USB hub 100 may determine whether a device is a keyboard, mouse, or storage device, for example. USB hub 100 may obtain this information during enumeration by looking at the class of the device. USB hub 100 may then selectively block a storage device so that data may not be transferred to the storage device. In certain embodiments, USB hub 100 may block storage devices by halting the connection process so that the device does not fully enumerate. In other embodiments, USB hub 100 may block storage devices by forcing a detach event. In still other embodiments, USB hub 100 may block storage devices by forcing the connection to communicate at a very low speed. While this later feature may not fully block the connection, it may provide data security by not allowing large amounts of data to be downloaded in short periods of time. USB hub 100 may implement these different blocking schemes when a storage device attempts to connect. In the same or different embodiments, all printer class devices may be blocked. In the same or still other embodiments, all devices with BULK OUT endpoints (i.e., outgoing data) may be blocked. Thus, USB hub 100 may provide data security by blocking connections from potentially dangerous device types. Conversely, USB hub 100 may allow a keyboard or mouse device to enumerate and operate normally.

In other embodiments, USB hub 100 may provide data security by acting as a USB to USB bridge. For example, when a device attempts to connect to one of downstream ports 116a-d of USB hub 100, USB hub 100 may determine the type of device attempting to connect. In this embodiment, USB hub 100 may block all devices other than keyboards and mice. When a keyboard or mouse attempts to connect to one of downstream ports 116a-d, USB hub 100 may enumerate the port as an emulation keyboard or an emulation mouse, respectively. In this scenario, control processor 106 may implement software that emulates a USB keyboard or USB mouse, and USB hub 100 may then manage the traffic between the upstream host port and the keyboard/mouse device without either the host or device knowing about the USB to USB bridge. For example, control processor 106 may control multiplexors/demultiplexors 114a-d to cause data sent from the device to the host to be directed to control processor 106 rather than to USB hub core 102. Control processor 106 would be similarly able to receive transmissions from the host via upstream port 104. By emulating the mouse/keyboard device, control processor 106 may only allow safe data traffic. Thus, data traffic may be one-directional and bi-directional traffic may be terminated by the bridge. According to certain embodiments, special modes or functions of new generation devices that may require special drivers may be blocked by the USB to USB bridge.

Figure 5:
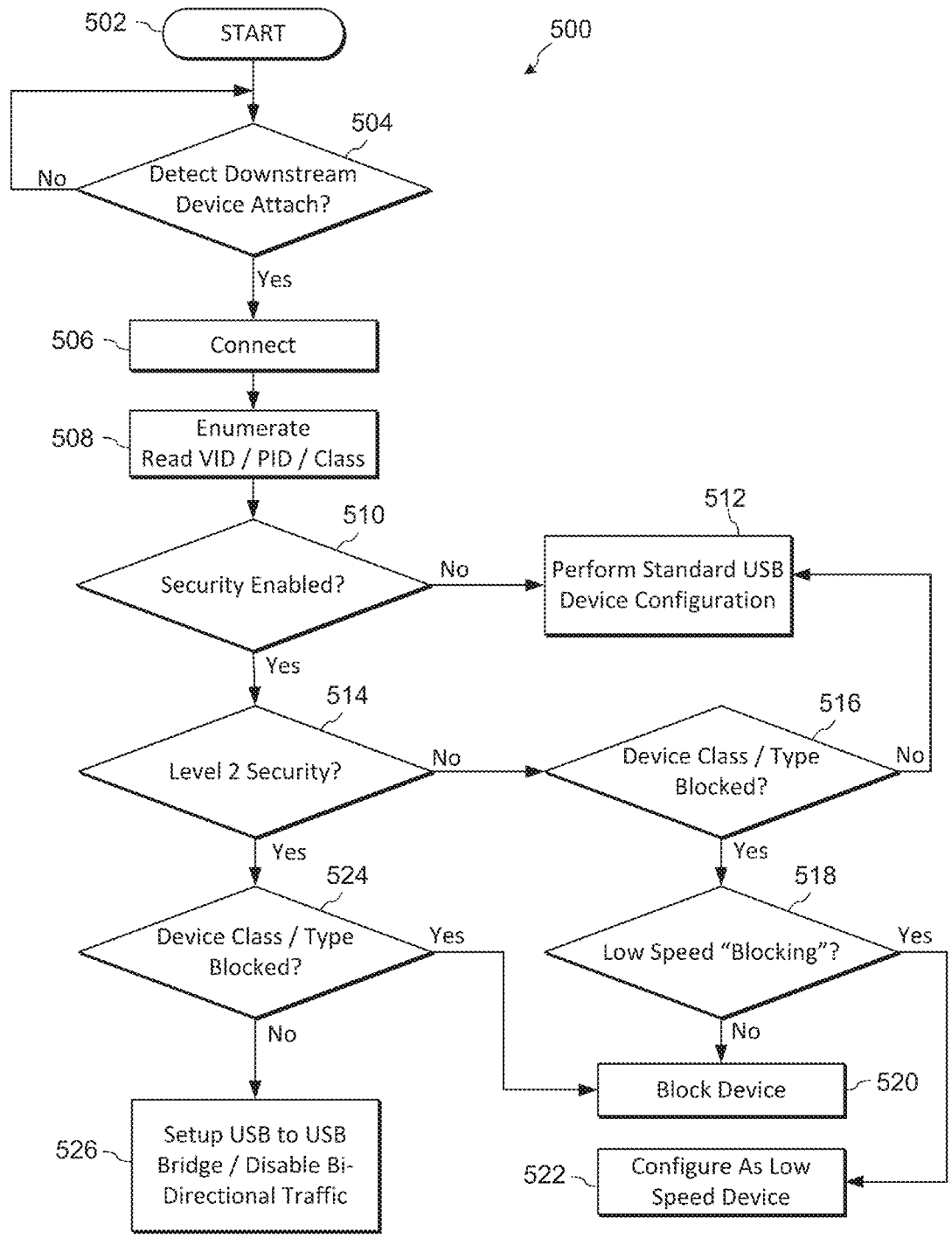
FIG. 5 illustrates a flow chart of an example method for providing enhanced data storage security in a USB hub, in accordance with certain embodiments of the present disclosure.

FIG. 5 illustrates a flow chart of an example method 500 for providing enhanced data storage security in a USB hub, in accordance with certain embodiments of the present disclosure. According to one embodiment, method 500 preferably begins at step 502. As noted above, teachings of the present disclosure may be implemented in a variety of configurations of USB hub 100. As such, the preferred initialization point for method 500 and the order of the steps 502-526 comprising method 500 may depend on the implementation chosen.

At step 502, USB hub 100 may initialize. For example, USB hub 100 may be powered on (via power source or connection to USB host), and USB hub core 102 may initialize. At step 504, USB hub 100 may continuously check to determine whether a downstream device has been attached, for example, to one of downstream ports 116a-d. If no downstream devices have been attached, USB hub 100 may return to step 504 and continue in this manner until a downstream device is detected. Upon detecting a downstream device connect, USB hub 100 may connect to the detected device at step 506 and may enumerate the device at step 508. During enumeration, USB hub 100 may read the VID, PID, and device class of the newly-attached device.

At step 510, USB hub 100 may determine whether the data security feature is enabled, for example, by checking the "Data Security?" value in configuration table 300. If the "Data Security?" value is not enabled, method 500 may proceed to step 512 and enumerate the device according to standard USB protocol. If the "Data Security?" value is enabled, method 500 may proceed to step 514 and determine whether the data security level 2 feature (i.e., the USB to USB bridge feature) is enabled, for example, by checking the "Data Security Level 2?" value in configuration table 300. If not enabled, method 500 may proceed to step 516 and may determine whether the device attempting to attach to USB hub 100 is of a class or type that should be blocked by the data security feature. In one embodiment, USB hub 100 may use the "Data Security Specification" value (DS_Specification) in configuration table 300 to determine what classes or types of devices should be blocked when the data security feature is enabled. For example, and without limitation, DS_Specification may contain a list of device classes (e.g., mass storage, printers, etc.) or types of devices (e.g., devices with BULK OUT endpoints, etc.) that should be blocked.

Method 500 may use this information in DS_Specification to determine whether the device attempting to connect to USB hub 100 should be blocked at step 516. If the device attempting to connect to USB hub 100 does not fall within those devices listed in the DS_Specification, method 500 may proceed to step 512 and enumerate the device according to standard USB protocol. Otherwise, method 500 may proceed to step 518 and determine whether the data security feature implements the "Low Speed" blocking feature described above. In certain embodiments, this configuration option is provided in the DS_Specification configuration value (along with the device classes/types that should be blocked). In alternative embodiments, configuration table 300 may contain a separate "Low Speed Blocking'?" configuration option. If at step 518 USB hub 100 determines that the Low Speed blocking feature is enabled, method 500 may proceed to step 522 where the device may enumerate and may be configured as a low speed device. If at step 518 USB hub 100 determines that the Low Speed blocking feature is not enabled, method 500 proceeds to step 520 where the device connection may be blocked.

Returning to step 514, if USB hub 100 determines that the level 2 security feature is enabled, method 500 may proceed to step 524 and may determine whether the device attempting to attach to USB hub 100 is of a class or type that should be blocked by the level 2 security feature. Method 500 may make the determination in step 524 in a similar manner as discussed with respect to step 516. If USB hub 100 determines that the device attempting to attach should be blocked, method 500 may proceed to step 512 where the device connection may be blocked. Otherwise, method 500 may proceed to step 526 where USB hub 100 may establish a USB to USB bridge (as discussed above).

Vendor Matching

USB hub 100 may provide a vendor matching feature that gives preference to devices manufactured by one or more vendors. For example, a device manufactured by a preferred vendor may be given the highest bandwidth connection or the most power available. In contrast, a device manufactured by a non-preferred vendor may be given a lower bandwidth connection or a lower power connection. In this manner, devices provided by preferred vendors may appear to have superior performance.

Figure 6:
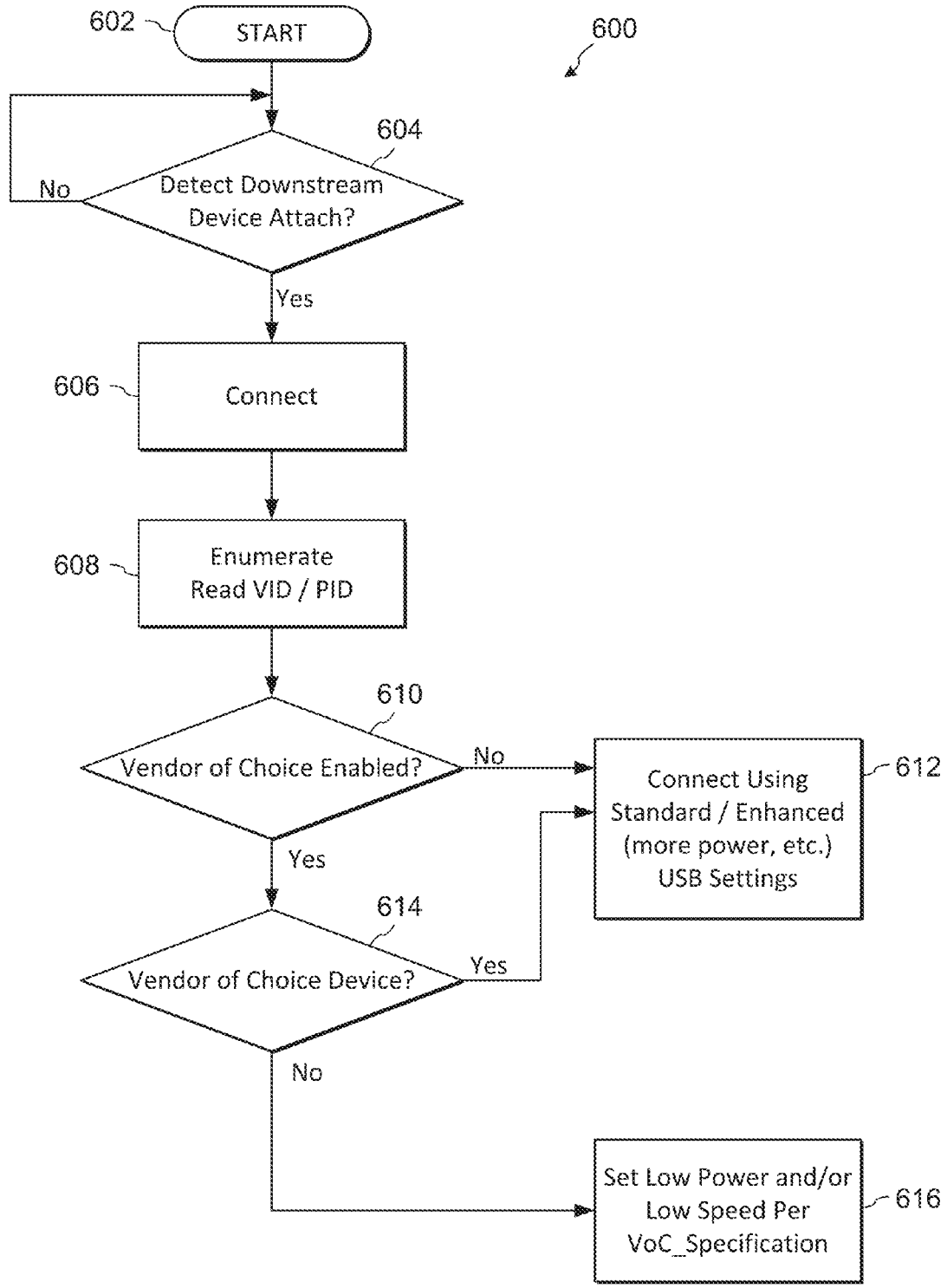
FIG. 6 illustrates a flow chart of an example method for providing enhanced vendor matching in a USB hub, in accordance with certain embodiments of the present disclosure.

FIG. 6 illustrates a flow chart of an example method 600 for providing enhanced vendor matching in a USB hub, in accordance with certain embodiments of the present disclosure. According to one embodiment, method 600 preferably begins at step 602. As noted above, teachings of the present disclosure may be implemented in a variety of configurations of USB hub 100. As such, the preferred initialization point for method 600 and the order of the steps 602-616 comprising method 600 may depend on the implementation chosen.

At step 602, USB hub 100 may initialize. For example, USB hub 100 may be powered on (via power source or connection to USB host), and USB hub core 102 may initialize. At step 604, USB hub 100 may continuously check to determine whether a downstream device has been attached, for example, to one of downstream ports 116*a-d*. If no downstream devices have been attached, USB hub 100 may return to step 604 and continue in this manner until a downstream device is detected. Upon detecting a downstream device connect, USB hub 100 may connect to the detected device at step 606 and may enumerate the device at step 608. During enumeration, USB hub 100 may read the VID and PID of the newly-attached device.

At step 610, USB hub 100 may determine whether the vendor of choice feature is enabled, for example, by checking the "Vendor of Choice?" value in configuration table 300. If the "Vendor of Choice?" value is not enabled, method 600 may proceed to step 612 and enumerate the device according to standard USB protocol. If the "Vendor of Choice?" value is enabled, method 600 may proceed to step 614 and determine whether the device attempting to connect is provided by a vendor of choice. According to one embodiment, USB hub 100 may use the "Vendor of Choice Specification" value (VoC_Specification) in configuration table 300 to determine what vendor (or vendors) are preferred vendors. For example, and without limitation, VoC_Specification may contain a list of one or more vendor IDs (VIDs) corresponding to the preferred vendors. In this embodiment, USB hub 100 may simply determine whether the VID of the device attempting to connect matches a VID in the VoC_Specification list. In alternative embodiments, USB hub 100 may determine whether the device attempting to connect is provided by a preferred vendor by searching database 200 for a matching VID/PID combination and, if a match is found, determining whether the "Vendor of Choice?" column in the matching row of database 200 is enabled. If at step 614 USB hub 100 determines that the device is provided by a preferred vendor, method 600 may proceed to step 612 and enumerate the device according to standard (or enhanced—e.g., more power, etc.) USB protocol. If at step 614 USB hub 100 determines that the device is not provided by a preferred vendor, method 600 may proceed to step 616 and may enumerate the device with a sub-optimal power and/or speed configuration. In one embodiment, the VoC_Specification in configuration table 300 provides the settings that should be assigned to devices provided by non-preferred vendors (e.g., whether to configure the device with sub-optimal power, speed, or both).

Device Authentication

USB hub 100 may provide a device authentication feature that prevents a device from attaching to the upstream USB host without the proper credentials. In one embodiment, when a device attempts to attach to USB hub 100, USB hub 100 may utilize USB host stack+mini scheduler+message pipes 108 and may enumerate the device, the USB hub 100 connecting to the device as a USB host. In this embodiment, USB hub 100 may initiate transactions comprising an authentication challenge. If the device does not respond to the authentication challenge or responds incorrectly, USB hub 100 may block the connection. In some embodiments, USB hub 100 may be configured to issue more than one authentication challenge in the event the device responds incorrectly to the first challenge.

Figure 7:
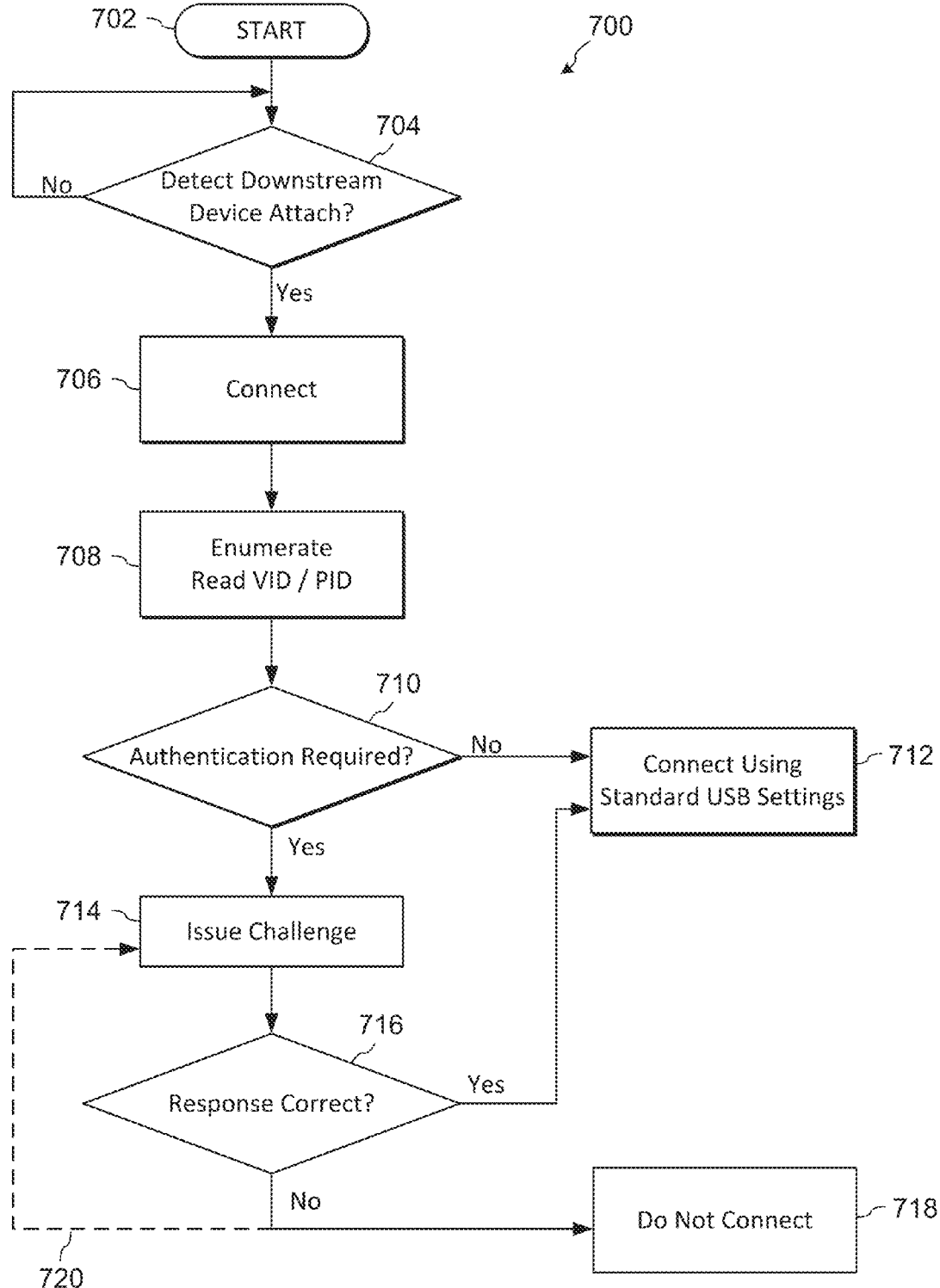
FIG. 7 illustrates a flow chart of an example method for providing enhanced device authentication in a USB hub, in accordance with certain embodiments of the present disclosure.

FIG. 7 illustrates a flow chart of an example method 700 for providing enhanced device authentication in a USB hub, in accordance with certain embodiments of the present disclosure. According to one embodiment, method 700 preferably begins at step 702. As noted above, teachings of the present disclosure may be implemented in a variety of configurations of USB hub 100. As such, the preferred initialization point for method 700 and the order of the steps 702-718 comprising method 700 may depend on the implementation chosen.

At step 702, USB hub 100 may initialize. For example, USB hub 100 may be powered on (via power source or connection to USB host), and USB hub core 102 may initialize. At step 704, USB hub 100 may continuously check to determine whether a downstream device has been attached, for example, to one of downstream ports 116a-d. If no downstream devices have been attached, USB hub 100 may return to step 704 and continue in this manner until a downstream device is detected. Upon detecting a downstream device connect, USB hub 100 may connect to the detected device at step 706 and may enumerate the device at step 708. In one embodiment, USB hub 100 may utilize USB host stack+mini scheduler+message pipes 108 to enumerate the device so that the USB hub 100 connects to the device as a USB host. During enumeration, USB hub 100 may read the VID and PID of the newly-attached device.

At step 710, USB hub 100 may determine whether the newly-attached device requires authentication. For example, the VID/PID may be provided to control processor 106, and control processor 106 may query database 200 to determine whether it contains an entry (row) that matches the VID/PID of the newly-attached device and whether any matching entry indicates that the device requires authentication (i.e., column G "Auth Req'd?" is enabled). If there is no VID/PID match in database 200, method 700 may proceed from step 710 to step 712 and may allow the device to connect to upstream USB port 104 in any manner discussed above related to instances where USB hub 100 has connected to the device as a USB host. If USB hub 100 determines at step 710 that there is a VID/PID match in database 200, method 700 may proceed from step 710 to step 714.

At step 714, USB hub 100 may issue an authentication challenge to the device. The authentication challenge may take any number of forms known to those skilled in the art and may generally be defined in the Authentication Specification (column H) in database 200 corresponding to the newly-attached device VID/PID. For example, the Authentication Specification may indicate that the device should respond to the authentication challenge with a particular pin number or password. In other embodiments (i.e., USB hub 100 is connected to the internet), the Authentication Specification may provide for more complex authentication methods including, without limitation, remote authentication, etc.

At step 716, USB hub 100 may determine whether the device has responded correctly to the authentication challenge. If the device provided a correct response, method 700 may proceed from step 716 to step 712 and may allow the device to connect to upstream USB port 104 in any manner discussed above related to instances where USB hub 100 has connected to the device as a USB host. If the device provided an incorrect response, USB hub 100 may attempt to re-issue the challenge by going back to step 714 (dotted line 720) if the Authentication Specification allows retries. Otherwise, method 700 may proceed to step 718 and the device is not allowed to connect to the USB host at upstream port 104.

Data Capture/Debug

USB hub 100 may provide data capture and/or debug features. For example, USB hub 100 may be programmed to respond to certain USB traffic in a certain manner. Alternatively or in addition, USB hub 100 may be programmed to reflect traffic from one downstream port to another downstream port.

According to one embodiment, USB hub 100 may provide an automatic response to certain types of USB traffic. USB hub 100 may determine whether the auto respond feature is enabled, for example, by checking the "Auto Respond?" value in configuration table 300. In one embodiment, USB hub 100 may use the "Auto Respond Specification" value (AR_Specification) in configuration table 300 to determine what transactions require an auto response and what the response should be. For example, and without limitation, AR_Specification may contain a list of downstream ports, device classes (e.g., mass storage, printers, etc.), or types of devices (e.g., devices with BULK IN endpoints, etc.) that should be monitored for certain types of traffic. Similarly, AR_Specification may contain a list of the type of traffic (e.g., BULK IN packet, CONTROL READ, etc.) that should receive an auto response. Further, AR_Specification may provide the response USB hub 100 should provide when encountering the specified traffic. As a non-limiting example, AR_Specification may specify that the data phase of a BULK IN transactions on downstream port 116c should receive a NAK handshake. In this example, USB hub 100 may monitor downstream port 116c, and following a transfer by the device of BULK IN data, USB host 100 may cause multiplexor/demultiplexor 114c to pass a NAK handshake from control processor 106 to downstream port 116c rather than the response that would otherwise be transmitted from the upstream host (via the multiplexor/demultiplexor 114c input connected to USB hub core 102 via signal 110c). By controlling multiplexors/demultiplexors 114a-d, USB control processor 106 may provide auto responses in either direction (i.e., upstream or downstream).

According to the same or alternative embodiment, USB hub 100 may provide data reflection from one downstream port to another downstream port (according to the USB specification, all traffic originating at upstream port 104 is broadcast to all downstream devices). USB hub 100 may determine whether the data reflect feature is enabled, for example, by checking the "Data Reflect?" value in configuration table 300. In one embodiment, USB hub 100 may use the "Data Reflect Specification" value (DR_Specification) in configuration table 300 to determine what transactions require data reflection. For example, and without limitation, DR_Specification may contain a list of downstream ports, device classes (e.g., mass storage, printers, etc.), or types of devices (e.g., devices with BULK IN endpoints, etc.) for which data should be reflected. Further, DR_Specification may specify the destination port onto which the data should be reflected.

Figure 8:
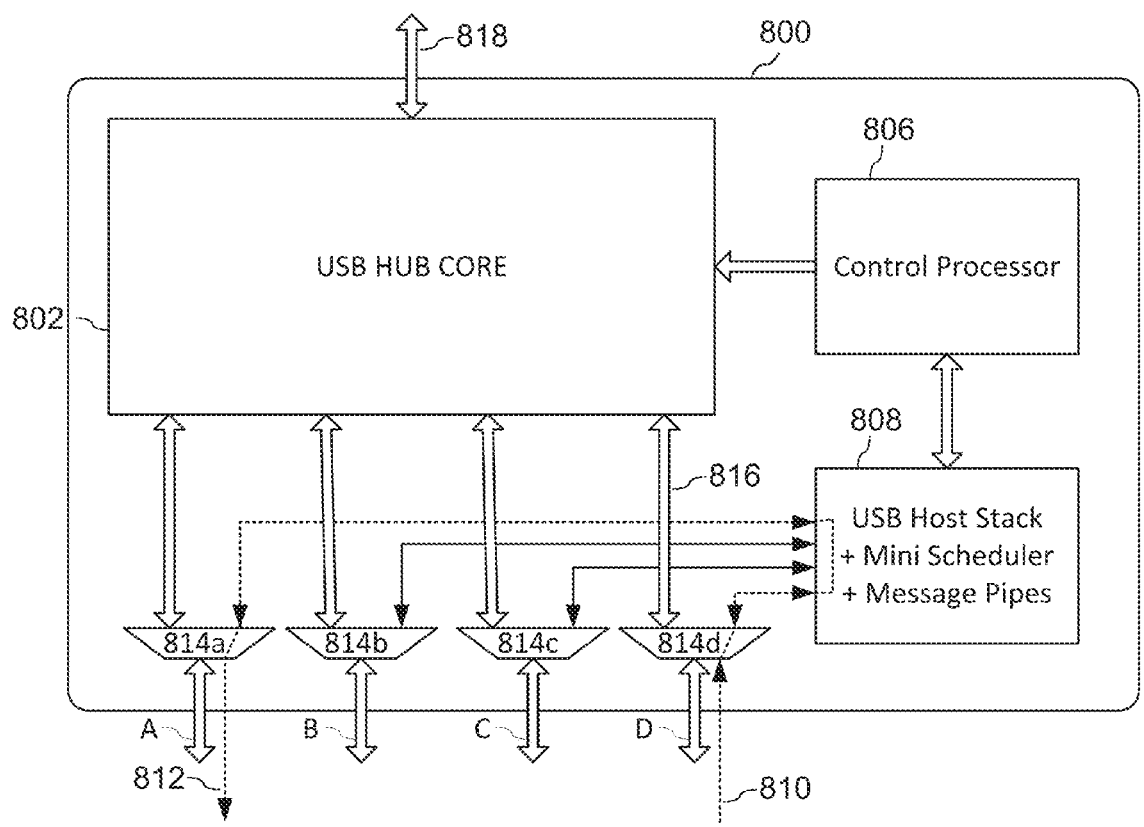
FIG. 8 illustrates a block diagram of an example USB hub that can provide data capture/debug, in accordance with certain embodiments of the present disclosure.

FIG. 8 illustrates a block diagram of an example data reflection in USB hub 800 using the data reflection feature, in accordance with certain embodiments of the present disclosure. In this example, DR_Specification may specify that signal 810 from downstream port D should be reflected as signal 812 on downstream port A. By controlling multiplexors/demultiplexors 814*a* and 814*d*, USB control processor 106 may provide data reflection (dotted line) from signal 810 to 812. At the same time, signaling 810 on downstream port 810 is passed through to USB hub core 802 (and subsequently to upstream port 818) via connection 816. According to this embodiment, downstream port A may be connected to a device capable of monitoring the reflected data, e.g., for debug or other purposes.

In an alternative embodiment, data reflection may be controlled via physical inputs on USB hub 800. In such an embodiment, control processor may comprise general purpose I/O pins connected to physical switches. Similar to the DR_Specification, these physical switches may specify one or both of (1) whether data reflection is enabled, and (2) the source and destination ports for the data reflection feature. For example, a 4-port hub embodiment of the present disclosure (such as shown in FIG. 8) may provide a physical "DR On/Off" button, a 4-position "DR Source" switch, and a 4-position "DR Destination" switch. User of USB hub 800 may set the "DR Source" switch to downstream port D and the "DR Destination" switch to downstream port A and may enable data reflection by turning the "DR On/Off" switch to the On position. With these settings, USB hub 800 will behave as described with respect to FIG. 8, in that data from downstream port D will be reflected to downstream port A. Certain embodiments of the present disclosure may combine the use of physical switches along with the DR_Specification to provide various levels of physical vs. software control of the data reflection feature.

Role Switching

FlexConnect is a feature unique to Microchip USB hubs. This feature allows the hub to dynamically change the physical ports that act as upstream and downstream ports. This allows a system designer to develop a product that acts as a USB host and a USB device without the requirement of two dedicated connectors. This also allows a system that had this capability on one port to expand the devices connected to that port through a FlexConnect hub. Microchip's Flex-Connect feature is further described in Microchip Application Note AN1700, the entirety of which is incorporated herein by reference. Currently, the FlexConnect feature requires both the device and the host to be FlexConnect aware.

USB hub 100 may implement a role switching feature that allows a FlexConnect device connected to USB hub 100 to switch roles and act as the USB host where the USB host connected to upstream port 104 of USB hub 100 is not FlexConnect aware or where the upstream USB host is not present.

Figure 9:
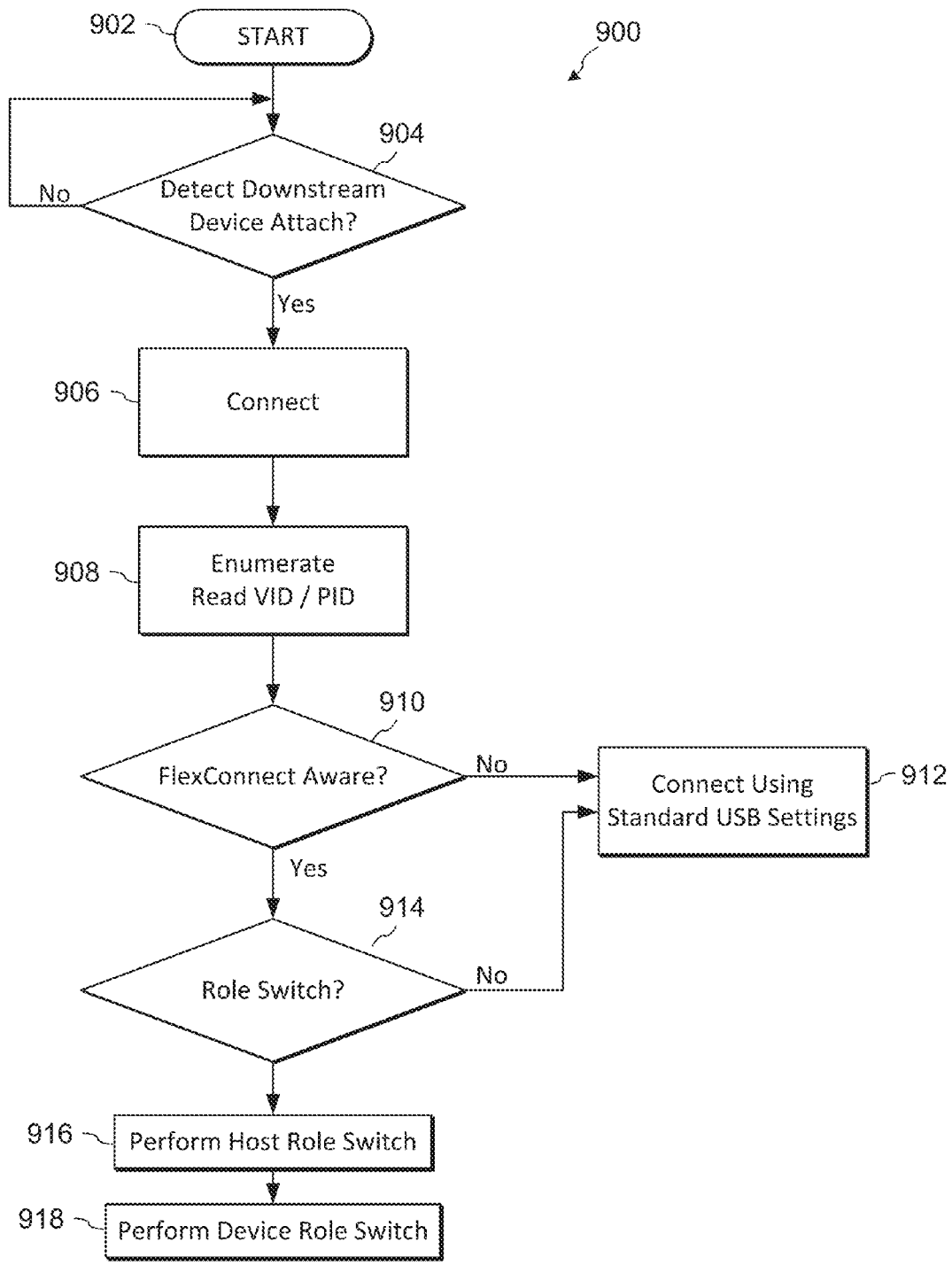
FIG. 9 illustrates a flow chart of an example method for providing enhanced role switching in a USB hub, in accordance with certain embodiments of the present disclosure.

FIG. 9 illustrates a flow chart of an example method 900 for providing enhanced role switching in a USB hub, in accordance with certain embodiments of the present disclosure. According to one embodiment, method 900 preferably begins at step 902. As noted above, teachings of the present disclosure may be implemented in a variety of configurations of USB hub 100. As such, the preferred initialization point for method 900 and the order of the steps 902-918 comprising method 900 may depend on the implementation chosen.

At step 902, USB hub 100 may initialize. For example, USB hub 100 may be powered on (via power source or connection to USB host), and USB hub core 102 may initialize. At step 904, USB hub 100 may continuously check to determine whether a downstream device has been attached, for example, to one of downstream ports 116*a-d*.

If no downstream devices have been attached, USB hub 100 may return to step 904 and continue in this manner until a downstream device is detected. Upon detecting a downstream device connect, USB hub 100 may connect to the detected device at step 906 and may enumerate the device at step 908. USB hub 100 may utilize USB host stack+mini scheduler+message pipes 108 to enumerate the device so that the USB hub 100 connects to the device as a USB host. During enumeration, USB hub 100 may read the VID and PID of the newly-attached device.

At step 910, USB hub 100 may determine whether the newly-attached device is FlexConnect aware. For example, the VID/PID may be provided to control processor 106, and control processor 106 may query database 200 to determine whether it contains an entry (row) that matches the VID/PID of the newly-attached device and whether any matching entry indicates that the device is FlexConnect aware (i.e., column I "Flex Connect?" is enabled). If there is no VID/PID match in database 200, method 900 may proceed from step 910 to step 912 and may allow the device to connect to upstream USB port 104 in any manner discussed above related to instances where USB hub 100 has connected to the device as a USB host. If USB hub 100 determines at step 910 that there is a VID/PID match in database 200 and that the match indicates a FlexConnect aware device, method 900 may proceed from step 910 to step 914.

At step 914, USB hub 100 may determine whether the FlexConnect aware device wishes to become the USB host. For example, USB hub 100 may initiate a CONTROL READ transaction and determine that role switching should be performed based on the response provided by the device. In certain embodiments, the device may be configured to always cause role switching. In other embodiments, the device may include a user interface so that the user of the device can request that the device become the USB host. For example, the device may be a smart phone that is connected to USB hub 100 with the head unit of an automobile infotainment system connected as USB host to upstream port 104 of USB hub 100. The smart phone may present the user with a switch so that the user can choose to control the infotainment system from the smart phone. If at step 914 method 900 determines that role switching is not required, method 900 may proceed from step 910 to step 912 and may allow the device to connect to upstream USB port 104 in any manner discussed above related to instances where USB hub 100 has connected to the device as a USB host.

If at step 914 method 900 determines that role switching is required, method 900 may proceed to step 916. At step 916, USB hub 100 may cause the current USB host (if present) to switch to device mode. For example, USB hub 100 may use the USB OTG host negotiation protocol or session request protocol to initiate the change of direction. Alternatively, USB hub 100 may send a packet to the USB host indicating that the host should switch roles. At step 918, USB hub may cause the newly-attached device to switch to host mode. For example, USB hub 100 may use the USB OTG host negotiation protocol or session request protocol or the Microchip FlexConnect protocol to initiate the change of direction. Alternatively, USB hub 100 may send a packet to the device indicating the role switch. At step 918, USB hub 100 may also inform the device how much power it can draw for battery charging. The new host may enumerate all the devices on the bus so that it can control them. I the previous example including the smart phone and the automobile infotainment system, this role switching may allow the smart phone to control the infotainment system, for example, by playing music, adjusting volume in the automobile, etc. In the event the new host (e.g., the smart phone) is disconnected, USB hub 100 may inform the old host (if present) to switch roles and again act as the USB host.

Although FIGS. 4-7 and 9 disclose a particular number of steps to be taken with respect to the methods depicted therein, those method may be executed with greater or fewer steps than depicted. In addition, although FIGS. 4-7 and 9 disclose a certain order of steps to be taken with respect to the methods depicted there, the steps may be completed in any suitable order.

Using the methods and systems disclosed herein, a USB hub that can provide enhanced battery charging, data storage security, vendor matching, device authentication, data capture/debug, and role switching without requiring changes to the operating system or USB stack/drivers can be provided.

Although the present disclosure has been described in detail, it should be understood that various changes, substitutions, and alterations can be made hereto without departing from the spirit and the scope of the disclosure as defined by the appended claims.

What is claimed is:

1. A USB hub comprising:
    a hub upstream port;
    a plurality of hub downstream ports;
    a processor;
    a memory communicatively coupled to the processor for storing USB host stack code and a plurality of configuration parameters;
    a USB hub core having a core upstream port and a plurality of core downstream ports, the USB hub core operable to implement a USB hub interface between the core upstream port and the plurality of core downstream ports; and
    a plurality of multiplexors, each of the plurality of multiplexors connected to a respective one of the plurality of core downstream ports, and each multiplexor having:
        a first port communicatively coupled to one of the hub downstream ports,
        a second port communicatively coupled to one of the plurality of core downstream ports,
        a third port communicatively coupled to the processor, and
        a select input communicatively coupled to the processor and operable to communicatively couple the first port with the second port, the third port, or both the second port and the third port, the select input of each of the plurality of multiplexors being independently controllable by the processor for independent control of the connections provided by each of the plurality of multiplexors;
    wherein the processor is configured:
        to detect when a USB device is coupled to a first one of the plurality of hub downstream ports,
        to control the select input of a first multiplexor connected to the first hub downstream port so that the first port is connected to the third port,
        to run the USB host stack code,
        to enumerate the USB device,
        charge the USB device using a custom electrical handshake;
        charge the USB device using a custom message-based handshake;
        obtain a product ID (PID) and a vendor ID (VID) from the USB device,
        use the PID and the VID to determine a custom battery charging protocol for the USB device,
    and cause the USB hub to charge the USB device a specific battery charging protocol corresponding to the USB device, the specific battery charging protocol one of the custom electrical handshake and the custom message-based handshake.

2. The USB hub according to claim 1, wherein after enumerating the USB device, the processor is further configured to cause the USB device to be enumerated by an upstream USB host coupled to the hub upstream port.

3. The USB hub according to claim 2, wherein the processor causing the USB device to be enumerated by the upstream USB host comprises:
    the processor controlling the select input of the first multiplexor so that the first port is connected to the second port; and
    the processor signaling reset to the USB device.

4. The USB hub according to claim 1, wherein the plurality of configuration parameters comprises a database containing a plurality of records having a plurality of fields, each record corresponding to a particular USB device handled by the USB hub.

5. The USB hub according to claim 1, wherein the processor is further configured to:
    obtain information from the USB device;
    use the obtained information to determine that the USB device should be blocked; and
    cause the USB hub to block the USB device connection.

6. The USB hub according to claim 5 wherein the obtained information is a device class code.

7. The USB hub according to claim 5 wherein the USB device connection is blocked by configuring the USB device as a low speed device.

8. The USB hub according to claim 1, wherein the processor is further configured to:
    obtain information from the USB device;
    use the obtained information to determine that the USB hub should establish a USB to USB bridge between the USB device and an upstream USB host; and
    implement the USB to USB bridge.

9. The USB hub according to claim 8 wherein the obtained information is a device class code.

10. The USB hub according to claim 8 wherein implementing the USB to USB bridge includes enumerating the first hub downstream port as an emulation device to the upstream USB host.

11. The USB hub according to claim 1, wherein the processor is further configured to:
    obtain a product ID (PID) and a vendor ID (VID) from the USB device;
    use the PID and the VID to determine that the USB device is not a vendor of choice device; and
    based on determining that the USB device is not a vendor of choice device, cause the USB device to enumerate with a sub-optimal configuration.

12. The USB hub according to claim 11 wherein the sub-optimal configuration is one or more of: a sub-optimal power configuration and a sub-optimal speed configuration.

13. The USB hub according to claim 1, wherein the processor is further configured to:
    obtain a product ID (PID) and a vendor ID (VID) from the USB device;
    use the PID and the VID to determine that the USB device requires authentication;
    based on determining that the USB device requires authentication, issue an authentication challenge to the USB device;

obtain an authentication challenge response from the USB device; and block the USB device connection upon determining that the response is incorrect.

14. The USB hub according to claim 1, wherein the processor is further configured to transmit a predetermined response upon detecting a specific transaction on the USB bus.

15. The USB hub according to claim 1, wherein the processor is further configured to reflect data from a source hub downstream port to a destination hub downstream port.

16. The USB hub according to claim 15, wherein the source hub downstream port and destination hub downstream port are determined based on one or more physical switches.

17. The USB hub according to claim 1, wherein the processor is further configured to:
obtain a product ID (PID) and a vendor ID (VID) from the USB device;
use the PID and the VID to determine that the USB device supports the FlexConnect role switching protocol;
based on determining that the USB device supports FlexConnect, cause the USB device to switch roles and become a USB host when there is no USB host connected to the hub upstream port or the USB host connected to the hub upstream port does not support the FlexConnect role switching protocol.

18. A method for providing enhanced battery charging in a USB hub including a plurality of hub downstream ports, a memory device storing USB device parameter data regarding a plurality of different USB devices, and a processor running USB host stack code, comprising:
the processor detecting a USB device is coupled to a first one of the plurality of hub downstream ports;
the processor enumerating the USB device;
the processor obtaining from the USB device a product ID (PID) and a vendor ID (VID) of the USB device;
the processor using the PID and the VID of the USB device to identify, from the memory device, pre-stored USB device parameter data corresponding with the PID and VID obtained from the USB device, the identified pre-stored USB device parameter data indicating a specific battery charging protocol for the USB device;
the processor causing the USB hub to charge the USB device using specific battery charging protocol identified by the USB device parameter data for the USB device pre-stored in the memory device of the USB hub;
the processor obtaining a product ID (PID) and a vendor ID (VID) from the USB device;
the processor using the PID and the VID to determine a custom battery charging protocol for the USB device;
the processor selecting between charging the USB device using a custom electrical handshake charging the USB device using a custom message-based handshake, the selection including identifying a specific battery charging protocol; and
the processor causing the USB hub to charge the USB device using specific battery charging protocol.

19. The method according to claim 18, wherein the processor causes the USB hub to charge the USB device according to the specific battery charging protocol identified by the pre-stored USB device parameter data for the USB device.

20. The method according to claim 18, wherein the pre-stored USB device parameter data for the USB device is stored in a configuration file stored in the memory prior to the USB device being coupled to the USB hub.

21. A method for providing data security in a USB hub including a plurality of hub downstream ports, a memory device storing USB device parameter data regarding a plurality of different USB devices, and a processor running USB host stack code, comprising:
the processor detecting a USB device is coupled to a first one of the plurality of hub downstream ports;
the processor enumerating the USB device;
the processor obtaining identification information from the USB device;
the processor using the identification information obtained from the USB device to identify, from the memory device, pre-stored USB device parameter data corresponding with the identification information obtained from the USB device, the pre-stored USB device parameter data indicating that the USB device should be blocked;
the processor causing the USB hub to block the USB device connection upon determining, based on the pre-stored USB device parameter data identified from the memory device of the USB hub, that the USB device should be blocked;
the processor obtaining a product ID (PID) and a vendor ID (VID) from the USB device;
the processor using the PID and the VID to determine a custom battery charging protocol for the USB device;
the processor selecting between charging the USB device using a custom electrical handshake charging the USB device using a custom message-based handshake, the selection including identifying a specific battery charging protocol; and
the processor causing the USB hub to charge the USB device using specific battery charging protocol.

22. The method according to claim 21, wherein the obtained information is a device class code.

23. The method according to claim 21, wherein the processor causes the USB hub to block the USB device connection by configuring the USB device as a low speed device.

24. A method for providing data security in a USB hub including a plurality of hub downstream ports, a memory device storing USB device parameter data regarding a plurality of different USB devices, and a processor running USB host stack code, comprising:
the processor detecting a USB device is coupled to a first one of the plurality of hub downstream ports;
the processor enumerating the USB device;
the processor obtaining identification information from the USB device;
the processor using the identification information obtained from the USB device to identify, from the memory device, pre-stored USB device parameter data corresponding with the identification information obtained from the USB device, the pre-stored USB device parameter data indicating that the USB hub should establish a USB to USB bridge between the USB device and an upstream USB host;
based on the pre-stored USB device parameter data identified from the memory device of the USB hub, the processor implementing the USB to USB bridge;
the processor obtaining a product ID (PID) and a vendor ID (VID) from the USB device;
the processor using the PID and the VID to determine a custom battery charging protocol for the USB device;

the processor selecting between charging the USB device using a custom electrical handshake charging the USB device using a custom message-based handshake, the selection including identifying a specific battery charging protocol; and the processor causing the USB hub to charge the USB device using specific battery charging protocol.

25. The method according to claim 24, wherein the obtained information is a device class code.

26. The method according to claim 24, wherein the processor implementing the USB to USB bridge comprises enumerating the first hub downstream port as an emulation device to the upstream USB host.

27. A method for providing vendor device preference in a USB hub including a plurality of hub downstream ports, a memory device storing USB device parameter data regarding a plurality of different USB devices, and a processor running USB host stack code, comprising:

the processor detecting a USB device is coupled to a first one of the plurality of hub downstream ports;

the processor enumerating the USB device;

the processor obtaining from the USB device a product ID (PID) and a vendor ID (VID) of the USB device;

the processor using the PID and the VID of the USB device to identify, from the memory device, pre-stored USB device parameter data corresponding with the PID and VID obtained from the USB device, the identified pre-stored USB device parameter data indicating that the USB device is not a vendor of choice device;

the processor causing the USB device to enumerate with a sub-optimal configuration upon determining, based on the pre-stored USB device parameter data identified from the memory device of the USB hub, that the USB device is not a vendor of choice devices;

the processor using the PID and the VID to determine a custom battery charging protocol for the USB device;

the processor selecting between charging the USB device using a custom electrical handshake charging the USB device using a custom message-based handshake, the selection including identifying a specific battery charging protocol; and the processor causing the USB hub to charge the USB device using specific battery charging protocol.

28. The method according to claim 27, wherein the sub-optimal configuration is one or more of: a sub-optimal power configuration and a sub-optimal speed configuration.

29. A method for providing device authentication in a USB hub including a plurality of hub downstream ports, a memory device storing USB device parameter data regarding a plurality of different USB devices, and a processor running USB host stack code, comprising:

the processor detecting a USB device is coupled to a first one of the plurality of hub downstream ports;

the processor enumerating the USB device;

the processor obtaining from the USB device a product ID (PID) and a vendor ID (VID) of the USB device;

the processor using the identification information obtained from the USB device to identify, from the memory device, pre-stored USB device parameter data corresponding with the identification information obtained from the USB device, the pre-stored USB device parameter data indicating that the USB device requires authentication;

the processor issuing an authentication challenge to the USB device upon determining, from the pre-stored USB device parameter data identified from the memory device of the USB hub, that the USB device requires authentication;

the processor obtaining an authentication challenge response from the USB device;

the processor blocking the USB device connection upon determining that the response is incorrect;

the processor using the PID and the VID to determine a custom battery charging protocol for the USB device;

the processor selecting between charging the USB device using a custom electrical handshake charging the USB device using a custom message-based handshake, the selection including identifying a specific battery charging protocol; and the processor causing the USB hub to charge the USB device using specific battery charging protocol.

30. A method for providing data reflection in a USB hub including a plurality of hub downstream ports and a processor running USB host stack code, comprising:

the processor determining a source port from the plurality of hub downstream ports;

the processor determining a destination port from the plurality of hub downstream ports; and the processor causing data at the source port to be reflected at the destination port;

wherein:

the USB hub further includes a physical source switch coupled to the processor and a physical destination switch coupled to the processor;

the method includes:

the processor determining the source port based on one of: a source port configuring value and the physical source switch; and the processor determining the destination port based on one of: a destination port configuration value and the physical destination switch.

* * * * *